US005913990A

United States Patent [19]

Kramer

[11] Patent Number: 5,913,990

[45] Date of Patent: Jun. 22, 1999

[54] METHOD AND DEVICE FOR THE CONTINUOUS PRODUCTION OF PANELS OF LIGNOCELLULOSE-CONTAINING PARTICLES

[76] Inventor: Jürgen Kramer, Stieglitzweg 30, D-21224 Rosengarten, Germany

[21] Appl. No.: 08/930,801

[22] PCT Filed: Feb. 6, 1997

[86] PCT No.: PCT/EP97/00529

§ 371 Date: Oct. 8, 1997

§ 102(e) Date: Oct. 8, 1997

[87] PCT Pub. No.: WO97/28936

PCT Pub. Date: Aug. 14, 1997

[30] Foreign Application Priority Data

Feb. 8, 1996 [DE] Germany ........................... 196 04 574

[51] Int. Cl.[6] .............................. H05B 1/00; B29C 43/22

[52] U.S. Cl. ..................... 156/62.2; 156/274.6; 156/296; 156/312; 156/380.3; 264/120; 264/405; 264/DIG. 65; 425/83; 425/174; 425/371

[58] Field of Search ................................... 156/62.2, 296, 156/272.2, 274.6, 312, 380.3; 264/109, 405, DIG. 65; 425/83, 174

[56] References Cited

U.S. PATENT DOCUMENTS

| | | |
|---|---|---|
| 4,216,179 | 8/1980 | Lamberts et al. . |
| 4,293,509 | 10/1981 | Bücking . |
| 4,420,357 | 12/1983 | Neubauer et al. . |

*Primary Examiner*—Michael W. Ball
*Assistant Examiner*—Sam Chuan Yao
*Attorney, Agent, or Firm*—Pendorf & Cutliff

[57] ABSTRACT

A method for continuously producing panels (7) of lignocellulose-containing particles (2). According to the invention, binder is continuously applied to the particles (2) which are continuously shaped to form a mat (4). The mat (4) is continuously precompressed and at the same time continuously preheated by the effect of a high-frequency high-voltage field. The mat (4), which is guided in a plane, is compressed to form the panels (7) under the effect of further heat.

8 Claims, 3 Drawing Sheets

METHOD AND DEVICE FOR THE CONTINUOUS PRODUCTION OF PANELS OF LIGNOCELLULOSE-CONTAINING PARTICLES

BACKGROUND OF THE INVENTION

1. Field of the Invention

The invention concerns a method for continuously producing panels of lignocellulose-containing particles, whereby the binder is continuously applied to the particles, which are continuously shaped to form a mat. The mat is continuously pre-compressed and at the same time continuously preheated by the effect of a high-frequency high-voltage energy field. The mat which is guided onto a planar surface, is compressed to form the panels under the effect of further heat. Furthermore the invention concerns a device for carrying out such a method with a gluing machine for continuously applying glue onto the particles, with a mat-forming machine for continuously forming the particles to a mat, a prepress for continuously pre-compressing the mat, with a high-frequency heating unit for continuously preheating of the mat through applying a high-frequency high-voltage field and with a heatable press, which consists of two sheets of metal, which presses the mat which was guided onto a planar surface to panels by applying further heat.

2. Description of the Related Art

The invention thus refers only to methods and devices, which include at a minimum the pre-press and the high-frequency device which allows work continuously, this minimal equipment does not include sawing devices. The invention later considers methods and devices which hot-presses the mat, which was guided onto one planar surface into panels. Thus the application of calander-presses, which can be used only for panels with limited thickness and special material is excluded. In contrast the invention is not limited to a special binder, the invention is also not limited to a defined particle size or composition of the lignocellulose-containing particles. This means it does not matter whether the binder is urea-formaldehyde resin or a binder free from formaldehyde. In the same way it does not matter, whether the manufactured panels are particle boards, medium density fibre boards (MDF) or oriented strand boards (OSB). However the invention has distinguished advantages when manufacturing certain type of boards. A method and a device of the sort described in the preceding are described in "Proceedings 27$^{th}$ International Particle board/- Composite Materials Symposium" W.S.U. 1993, page 55 to 66:

SUCCESS STORY. MODERN PARTICLEBOARD USING EASTERN HARDWOODS. There a device for the continuous manufacturing of particleboard is described which establishes the continuous preheating of the mat using a high-frequency heating device before the pre-press for mat compression. The high-frequency heating unit increases the mat temperature from room temperature by about 40° C. It was reported there that by using high-frequency heating, the productivity of the line significantly increases because the pre-heated mat is pressed for a significantly shorter time in the finishing press. The heating-capacity of a high-frequency heating unit directly depends upon the field strength of the working alternating electrical field. For example, in order to reach the same heating-capacity when doubling the distance between the electrode platens the alternating voltage is to be doubled. Increasing the voltage increases the threat of high-voltage break downs which may lead to severe damaging of the high-frequency heating device. Additionally electricmagnetic impulses, which accompany break downs, may damage other electric or electronic installations. Finally, while producing panels, break downs may lead to ignition of the mat or to damaged areas on the finished boards.

Taking these problems into consideration, it is therefor necessary to locate a high frequency heating unit, for the continuous pre-heating of the mat, which has a working high-frequency alternating high voltage field, after the pre-press for continuous compressing of the mat, where the mat has only a reduced thickness. Therefor a significantly reduced distance between the electrodes of the high. frequency device is possible. In "Taschenbuch der Spanplattentechnik, Deppe/Emst, 3. Auflage", on page 175, such a high frequency-pre-press is mentioned together with a calander-line, where the mat is not conveyed onto one planar surface, but around a heating drum, while being heated. Calander presses are, as already mentioned, only suitable for producing thin panels. A production of OSB panels is impossible with calander-lines because of the spring-back properties of large two-dimensionally shaped wood particles. How a high-frequency pre-press for a calander-line should be built up is not shown in the immediate context nor in literature cited from Taschenbuch der Spanplattentechnik. One has, however, to proceed on the assumption, that when dealing with a known calander-line sequence, after a pre-press follows a high-frequency heating device. Essentially building in a high-frequency heating device in a calander-line is relatively unproblematic because the mat out of which thin boards are to be manufactured is itself thin, thus allowing for narrow distances between the electrodes of the high-frequency heating device.

High frequency heating units are also applied in lines for manufacturing of boards out of ligno-cellulose containing particles which do not work continuously. On the one side high frequency-heating of the mat is known for use with hot-pressing in a multi-daylight press. As multi-daylight presses with high frequency-heating are technically very high in expenditure and efficiency of high frequency-heating is limited the economy of such hot- presses is said to be poor.

Additionally, pre-compressors which do not work continuously which have a high frequency-heating for the mat during pre-compressing are known. There is a concern with one-daylight presses, which have a complicated technical construction, because the electrodes are spread over the whole length and width of the press for the homogeneous warming of the mat, whereby the length may lay in the range of some 20 meters. This means there is a problem because, for example, in the high frequency-heating device relatively high currents must flow, which are only manageable with high expenditures.

SUMMARY OF THE INVENTION

At the heart of the invention lays the task, to optimize the application of high frequency-heating in the continuous manufacturing of boards out of lignocellulose containing material.

According to the invention this task is completed with a method of the above described type, through warming-up the mat with the effect of the high-frequency high-voltage field at the same time the mat is continuously pre-compressed. In a device of the above described type, the high frequency- heating is located in the pre-press. By combining the pre-compressing and pre-heating of the mat at the same location, the high frequency-heating requires a minimum distance between electrodes, thus only a minimum alternating voltage is applied. In this way the threats of break downs, the paralleled disturbances, and the electromagnetical radiation from the high frequency-heating unit. Essentially only comparatively low expenditures for the high frequency-heating are necessary , because its electrodes are only going to be dimensioned to require comparatively low voltages. Contrary to a pre-press which does not work continuously, with high frequency-heating, expenditure on apparatus is also very low, because the high frequency-heating in the invention theoretically must only act on the mat continuously passing through in one line. This means that the distance between the electrodes could be kept small. Thus, with the low required voltage and the distance between the electrodes only relatively low currents must flow in the high frequency-heating unit. There are further advantages in the efficiency of the applied electrical energy, because it is proportion. to the product of voltage and current.

Through building the high frequency-heating into the pre-press of an existing facility for producing panels out of lignocellulose containing material, the production capacity can be significantly increased. Since the integration of the high frequency-heating into the pre-press requires no additional space, it can be realized with relatively low technical expenditure. Preferably the high-frequency alternating high-voltage field between the high frequency-heating acts on the mat at the location with the narrowest thickness while pre-compressing. There the lowest distance of the electrodes In the high frequency-heating device can be realized.

A big increase in productivity with the manufacturing of boards out of lignocellulose containing material is even realizable if the mat is only warmed up to temperatures below 60° C., especially between 45 and 55° C. With this relatively low temperatures undesired condensation of water or binder onto the pre-press is avoided, even if the bM1der is not specifically formulated to fit to the new process.

Particularly huge increases in the capacity of a facility for manufacturing boards out of lignocellulose containing material have been realized with boards in the thickness range of 12 to 22 millimeters. With smaller and higher board thickness the capacity advantage is not so significant. There the hot-pressing of the mat in the hot-press, which uses transfer of contact to warn, the advantage of the pre-heated mat Is not fully usable because of the shape of the temperature penetration curve.

Of particular advantage is the pre-heating of the mat in the pre-press by applying a high-frequency alternating high voltage field when manufacturing OSB-boards out of flat wood strands. Thin OSB-panels today can not be manufactured commercially with a continuous process, because the flat wood strands exert spring-back forces that are too high, which would damage the press coils of continuously working hot-presses. Through high frequency-heating in the pre-press, however, the lignin in the mat is plasticized and the binder starts to develop adhesive properties. Thus the spring-back forces are reduced tremendously. As a result, there is a very small expansion of the mat after the pre-press and the mat can also be finished to OSB-panels in a continuously working hot-press. The small expansion of the mat after the pre-press is a general characteristic of the invented method.

With the new device the electrodes of the high frequency.heating can be fixed on the backside of upper and lower pre-press conveyor belts. Thereby the electrodes of the high frequency-heating are preferable fixed at the location where the pre-press conveyor belts are closest to one other.

One electrode of the high frequency-heating can be earth, whereby the pre-pres conveyorbelt of the other side of the mat is to be built high frequency-resistant. If one electrode of the high frequency-heating is earth this is called an asymmetrical high frequency-supply. The earth electrode is also named cold electrode. In the area of this cold electrode the wear is lower than at the hot electrode. In changing an exiting conveyor belt for the manufacturing of boards out of lignocellulose containing material, only the pre-press conveyor belt attached to the hot electrode is changed to be high frequency-resistant.

BRIEF DESCRIPTION OF THE DRAWINGS

The invention in the following is explained in more detail with the help of some model examples, thereby represents FIG. 1 a flow chart for carrying out the new method, FIG. 2 the design of the pre-press with the new device (schematically), FIG. 3 the design of a continuous hot-press attached to the new device, FIG. 4 a press-distance diagram of a discontinuous hot-press attached to the new device, FIG. 5 two temperature penetration curves and two curves to compare with the new method, and FIGS. 6 and 7 transverse tensile strength against specific hot-press time with (FIG. 6) and without (FIG. 7) high frequency-pre-heating.

DETAILED DESCRIPTION OF THE INVENTION

Figure 1:
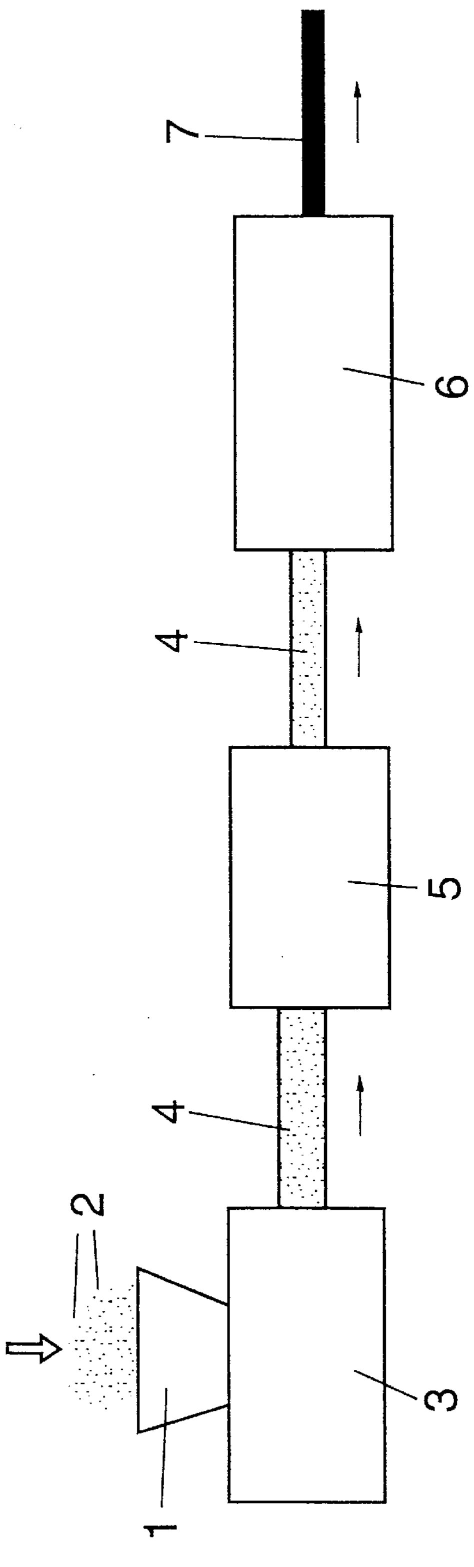
Figure 2:
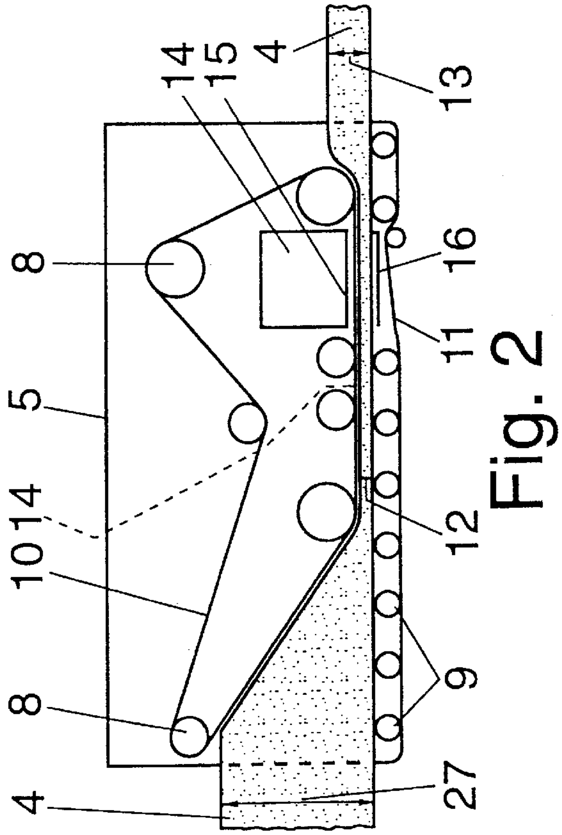

With the method outlined in FIG. 1 binder is continuously applied onto lignocellulose containing particles 2 in a gluing machine 1. Then the particles 2 continuously are formed in a matOformer 3 to a mat 4. In a pre-press 5 the mat 4 is continuously pre-compressed. At the same time, a high frequency-heating device for continuously pre-heating acts in the pre-press through a high-frequency high-voltage field on the mat 4. The warmed and pre-compressed mat 4 is than continuously pressed in a hot-press 6 to a board 7, which can afterwards be sawed to single boards. The gluing machine and the mat-former are known constructions. Here no changes to known lines for the manufacturing of boards out of lignocellulose containing particles are envisaged. A more detailed schematic construction of pre-press 5 is shown in FIG. 2. The feeding-thickness 27 of the mat 4 in the pre-press is between two pre-press conveyor belts 10 and 11 which are conveyed through rolls 8 and 9, producing the reduced thickness 12. After the conveyor belts 10 and 11 the mat expands to out-feed thickness 13. In the area of minimum thickness of mat 4, denoted as thickness 12 a high frequency-heating device is fixed. A possible location of a second high frequency-heating device 14 is marked by a dashed line. The existing high frequency-heating device 14 shows two electrodes 15 and 16, each fixed on the back-side of the pre-press conveyor belts 10 and 11. The electrode 16 is earth, thus the high frequency-heating works after the asymmetric supply principle. Therefor the electrode 16 is termed cold electrode and electrode 15 is termed hot electrode. As the high frequency-heating 14 acts to the mat 4 in the area of minimum thickness 12, a comparatively low voltage is sufficient to build the field-strength necessary for the desired energy-transfer to the mat 4. Simultaneously the threat of break downs is hold to narrow limits. Additionally, the pre-press conveyor belt 10 of the pre-press 5 is resistant to high-frequency. With the pre-press conveyor belt 11 attached to the cold electrode this is not absolutely necessary, but recommended too. Compared to pre-presses which are not equipped with a high frequency-heating 14, out-feed thickness 13 of the mat 4 after the pre-press 5 is comparatively low, because the spring-back forces in the mat 4 are reduced via high frequency-heating. This stems back to a plasticizing of lignin and an activation of the binder through warming the mat 4.

Figure 3:
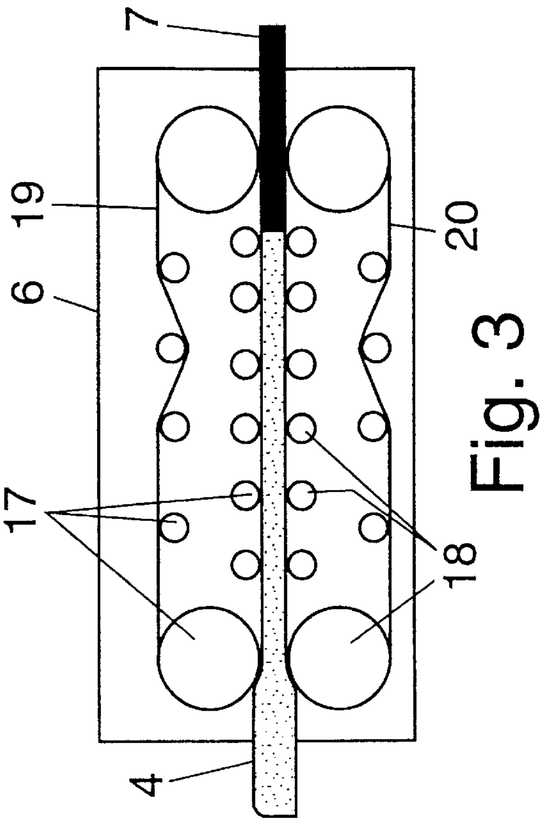

The hot-press 6 shown in FIG. 3 shows the normal construction of a continuously working hot-press, where the mat 4 is conveyed between to endless press-coils, which are lead over rollers 17 and 18, and thereby, heat-transfer, is pressed to the board 7. The heating elements are not shown on FIG. 3.

Figure 4:
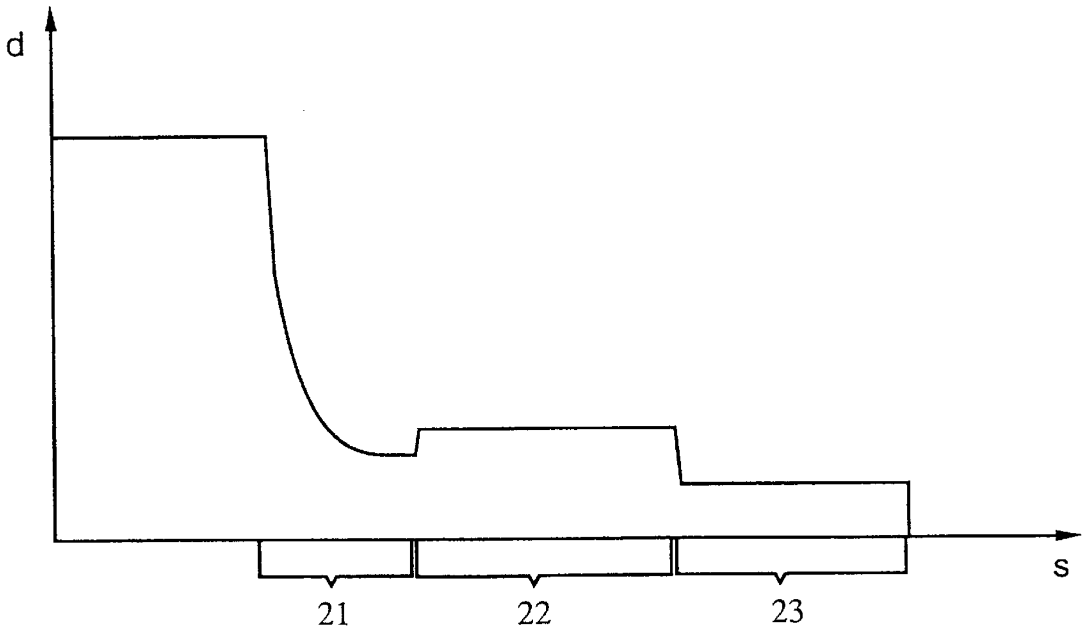

The vertical distance of the press-coils 19 and 20 are not constant over the length of the hot-press, as is shown on FIG. 4, where for a discontinuous hot-press this thickness d of the board 4 is drawn against s in the discontinuous hot-press. In the first part 21 the mat 4 is compressed. There surface layers of the mat 4 are heated through contact-heating transferred by press-coils 19 and 20. In a following part 22 the thickness of the board d is held constant at a slightly greater value, thereby the contact-heating of the press-coils 19 and 20 goes into the middle of the board. Afterwards the board 4 is pressed to the lowest thickness d in a part 23, to calibrate. After calibration the press is lifted. Then the board leaves the hot-press.

Figure 5:
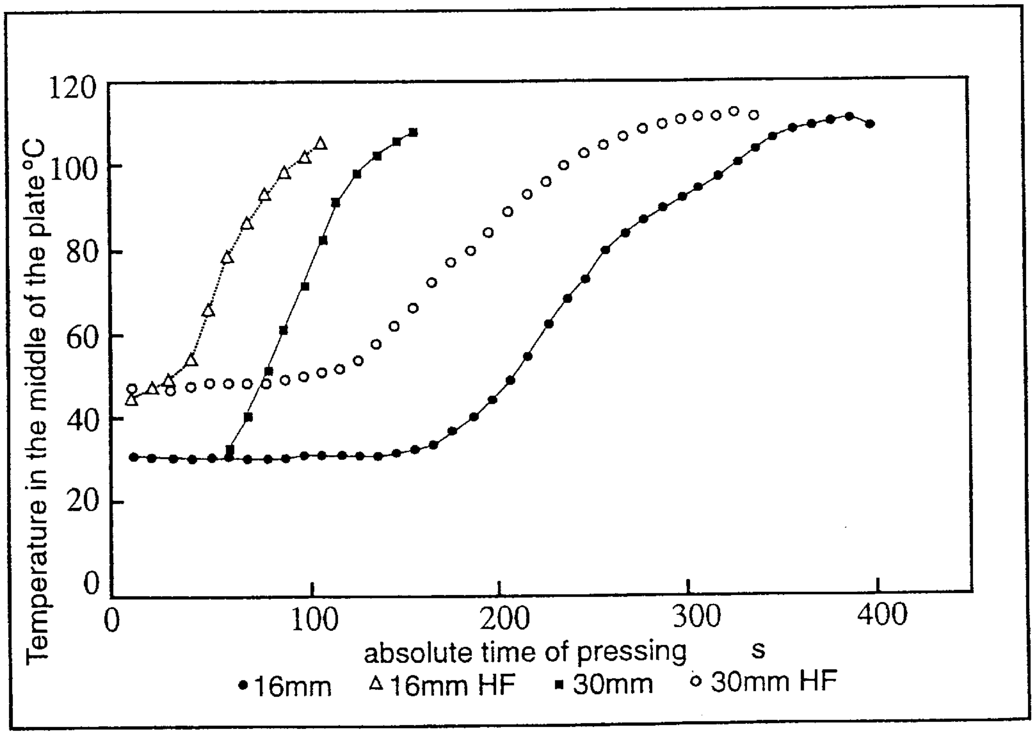

In FIG. 5 the change of temperature at the mid point of thickness of board 4 in the hot-press 6 is shown as a function of the absolute press-time t for two examples of the invention and two examples without high frequency-pre-heating. The empty triangles and the empty rhombs correspond to MDF-boards with a final thickness of 16 to 30 mm, which where produced according to the invention by using a high frequency-heating device 14 in the pre-press 5. The filled quarters and the filled circles correspond to the examples for comparison, where MDF-boards with a final thickness of 16 to 30 mm are manufactured without the high frequency-heating device. In mats pre-heated to 50° C. for 16 mm boards the temperature in the middle of the board increases fairly fast and reaches even after 60 seconds 80° C., i.e. 45 seconds earlier than with a pre-heated mat that was not pre-heated that started at a temperature of 30° C. In both cases the temperature of the heating platens heating the press-coils was 227° C. An analogous but flatter temperature pattern is to be seen with the 30 mm boards. With a starting temperature difference of about 20° C. between pre-heated and not pre-heated mats, the time difference to reach 80° C. with 30mm boards pre-heated and not pre-heated is 75 seconds. Related to the absolute press time, however, the relative time difference is smaller than with 16 mm boards. With the same starting conditions there was no difference in temperature pattern detected with binders from urea-formaldehyde resin and polyurethane resin type.

The temperature penetration curves in to FIG. 5 belong to the following examples:

1.16 mm boards

With the following starting conditions, MDF-boards with a final thickness of 16 mm were produced with and without warning the mats in the pre-press via a high-frequency high-voltage field:

| | |
|---|---|
| Wood type: | 100% coniferous wood About 90–95% pine and 5–10% spruce |
| Starting consistence: | Chips |
| Binder: | Urea-Formaldehyde |

-continued

| | |
|---|---|
| Gluing device type: | Blow-line gluing |
| Raw Thickness: | 17.8/17.5 mm |
| Thickness Shrinkage: | about 0.3 mm after cooling |
| Raw Density: | 770 kg per cubic meter |
| Solid Resin: | 10% bone-dry wood |
| Harder: | Without Harder |
| Moisture: | ca. 8–10% |
| Mat temperature without high frequency: | ca. 30° C. |
| Mat temperature with high frequency: | ca. 50° C. |
| Press time without high frequency: | 10 s/mm |
| Press time with high frequency: | 7.5–5.5 s/mm |
| Press temperature (heating platens): | 227° C. |

Figure 6:
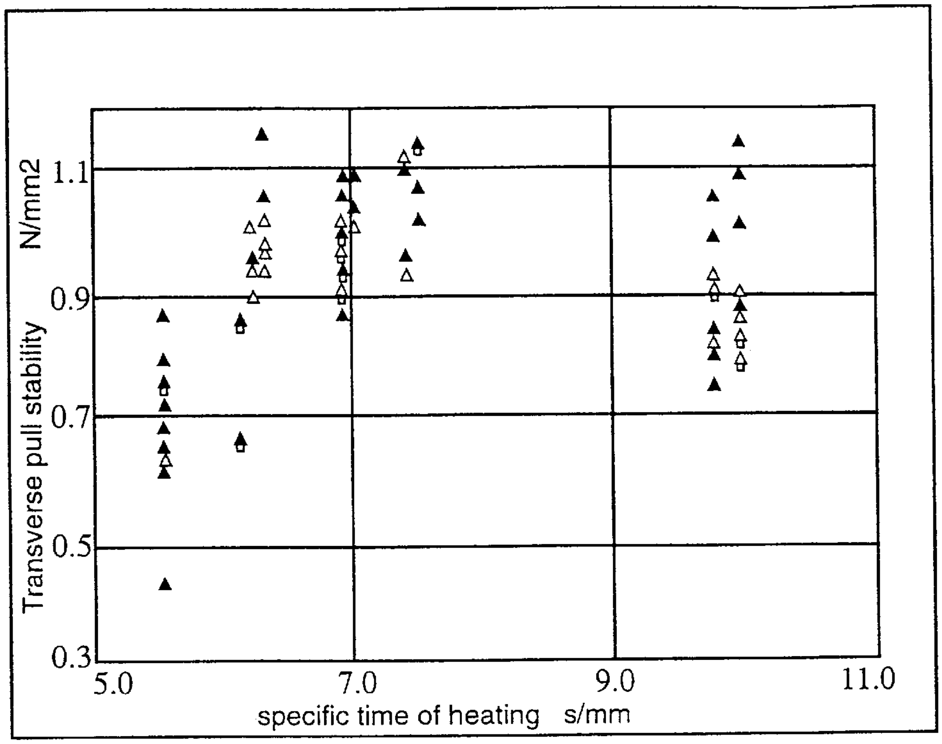

The tensile strength is determined according to EMB-standard, where each point in FIG. 6 is an average of five samples per board. In FIG. 6 on the right part, at 10 s/mm press time, the tensile strengths without high frequency-pre-heating of the mat are shown. On the left part, in the press time range of 5.5–7.5 s/mm tensile strengths with high frequency-pre-heating are shown. In the press time range of 7–7.5 s/mm equivalent to a press time reduction of 25–30%, the level of tensile strength is with high frequency-pre heating, significantly higher with high frequency-pre-heating than without. The spreading of values too, is smaller compared to the starting values without high frequency-pre-heating. At the press time of 6.3 s/mm the tensile strength level is slightly lower, but still higher than, values without high frequency-pre-heating. At a press time of 5.5 s/mm the level has lowered against starting values by 20%, but is still above EMB-standard.

2.30 mm boards

MDF-boards with a final thickness of 30 mm were produced under the following conditions.

| | |
|---|---|
| Wood type: | 100% coniferous wood About 90–95% pine and 5–10% spruce |
| Starting consistence: | Chips |
| Binder: | Urea-Formaldehyde resin (BASF 570/NESTE 36/75) |
| Gluing device type: | Blow-line gluing |
| Final Thickness: | 30 mm |
| Raw Thickness: | 32.0/32.6 mm |
| Thickness Shrinkage: | about 0.6 mm after cooling |
| Raw Density: | 750 kg per cubic meter |
| Solid Resin: | 12% bone-try wood |
| Harder: | Without Harder |
| Moisture: | ca. 10% |
| Mat temperature without high frequency: | ca. 30° C. |
| Mat temperature with high frequency: | ca. 50° C. |
| Press time without high frequency: | 13 s/mm |
| Press time with high frequency: | 11–8 s/mm |
| Press temperature (heating platens): | 227° C. |

Figure 7:
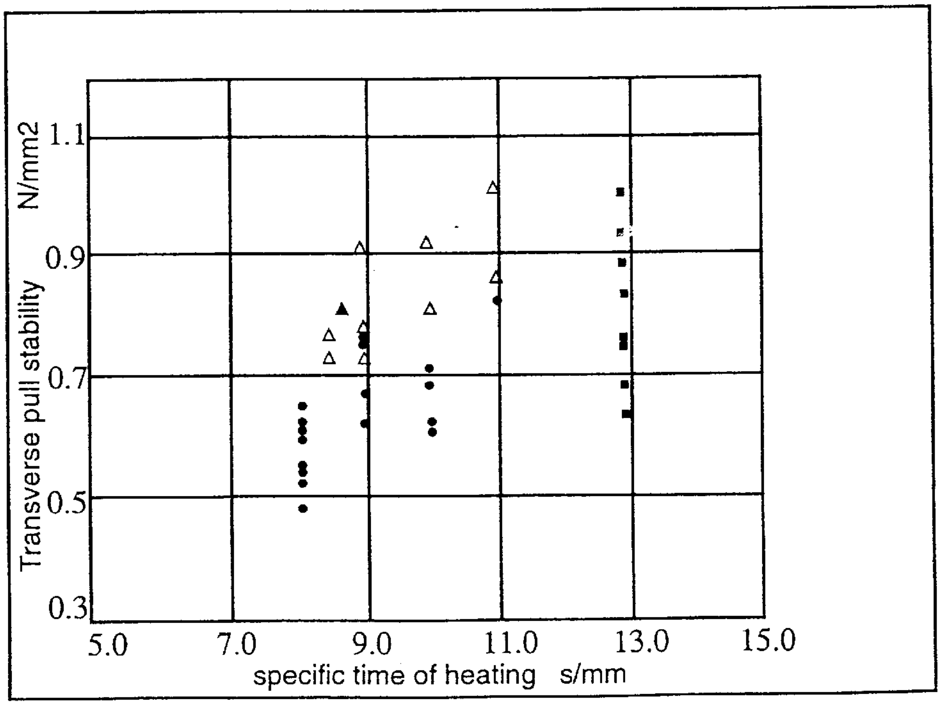

The tensile strengths, measured in the same way as with the 16 mm boards, are shown in FIG. 7.

At the right side of FIG. 7 over the press time of 13 s/mm are shown the strengths without high frequency-pre-heating, at the left over the press times of 8–11 s/mm are shown the strengths with high frequency-pre-heating. With a press time of 11 s/mm to 8 s/mm a downward trend below the starting values is recognizable. The high frequency-pre-heating, with a limit of 50° C. in the mat, is advisable for the range of thicker boards. The high frequency pre-heating is not as efficient as it is in the range of 12–22 mm boards because the heat penetration curve with thicker boards is not affected as much.

The high frequency-heating unit used in the examples of the invention has the following technical data:

| | | | |
|---|---|---|---|
| Operating usage power: | 15 kW with 100% usage | | |
| Frequency: | 27.12 MHz +- 0.6% | | |
| Connection to net: | 400 V threephase current | | |
| Control voltage: | 230 V/50 Hz | | |
| Net pick-up under full usage: | 32 kVA | | |
| High voltage rectifier: | silicium diode | | |
| Sending tube: | supplier: | ABB | |
| | type: | IQL 12-1 | |
| Electrode platan: | length: | 500 mm | |
| | width: | 800 mm | |

In warming the mat 4 with the high frequency-heating device to temperatures below 60° C., there is no condensation through temperature difference of warmed mat and cold pre-press, even without using special binders or other preventing activities with the pre-press. Higher temperatures in warming the mat 4 are possible if prevention activities with the pre-press conveyor belts and the binder are taken.

Reference List

1-gluing machine
2-particle
3-mat former
4-mat
5-pre-press
6-hot-press
7-board
8-roller
9-roller
10-pre-press conveyor belt
11-pre-press conveyor belt
12-thickness
13-out-feed thickness
14-high frequency-heating device
15-electrode
16-electrode
17-roller
18-roller
19-press-coil
20-press-coil
21-part
22-part
23-part
27-in-feed thickness

What is claimed is:

1. Method of manufacturing panels out of lignocellulose containing particles, said method comprising:

continuously applying binder on to lignocellulose containing particles;

continuously forming the particles into a mat;

continuously pre-compreusing the mat while: continuously warming the mat in the area of pre-compression through applying a high-frequency high-voltage field such that said high frequency voltage field acts on the mat at the location with the narrowest area of thickness while pre-compressing; and conveying the mat along a plane, wherein the mat conveyed along the plane is pressed into boards with additional heating.

2. Method according to claim 1, wherein the high-frequency high-voltage field is applied to the mat (4) in the area where the mat has the lowest thickness (12) while pre-compressing.

3. Method according to claim 1, wherein the mat (4) is warmed to a temperature below 60° C.

4. Method according to claim 3, wherein the mat (4) is warmed to a temperature between 45 and 55° C.

5. Method according to claim 1, wherein the panels (7) formed by pressing the mat (4) have a thickness from 12 to 22 mm.

6. Method according to claim 1, wherein the particles (2) are flat wood strands, and wherein an OSB- panel is continuously manufactured therefrom.

7. Facility for the production of panels from cellulose containing particles by a process comprising:

continuously applying binder on to linocellulose containing particles;

continuously forming the particles into a mat;

continuously pre-compressing the mat while continuously warming the mat in the area of pre-compression through applying a high-frequency high-voltage field; and conveying the mat along a plane, wherein the mat conveyed along the plane is pressed into boards with additional heating, said facility comprising:

a mat former for Continuously forming the particles to a mat;

a pre-press (5) for continuously pre-compressing the mat;

a HF-heating device for continuously warming the mat through applying a high-frequent high-voltage field; and a hot-press for pressing the mat conveyed along the plane between the preen-coils for applying further heat to the panels, wherein the HF-heating device (14) is located in the pre-press (5), wherein said HF-heating device (14) includes electrodes (15 and 16), wherein the pre-press conveyor belts (10 and 11) each have a front side and a back side, wherein the front side of the pre-press conveyor belts contact the mat from both sides for coveying the mat, wherein said electrodes are located on the back-side of the pre-press conveyor belts (10 and 11) of the pre-press (5) where the pre-press conveyor belts (10 and 11) are closest to one another.

8. Facility according to claim 7, wherein one electrode (16) of the HF-heating device is earth, and wherein the pre-press conveyor belt on the side opposite the earth electrode (16) attaching the mat (4) is resistant to high-frequency.

* * * * *